US011079749B2

(12) United States Patent
Zeller

(10) Patent No.: US 11,079,749 B2
(45) Date of Patent: Aug. 3, 2021

(54) METHOD AND APPARATUS FOR AUTOMATED HAZARD DETECTION

(71) Applicant: Siemens Aktiengesellschaft, Munich (DE)

(72) Inventor: Marc Zeller, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1086 days.

(21) Appl. No.: 15/622,578

(22) Filed: Jun. 14, 2017

(65) Prior Publication Data

US 2017/0364063 A1 Dec. 21, 2017

(30) Foreign Application Priority Data

Jun. 21, 2016 (EP) .................................... 16175543

(51) Int. Cl.
*G05B 23/02* (2006.01)
(52) U.S. Cl.
CPC ..... *G05B 23/0205* (2013.01); *G05B 23/0248* (2013.01)
(58) Field of Classification Search
None
See application file for complete search history.

(56) References Cited

U.S. PATENT DOCUMENTS 7,681,086 B2 * 3/2010 Vlassova ................ G06F 30/20
714/46
2013/0073271 A1 3/2013 Xiang
(Continued)

FOREIGN PATENT DOCUMENTS

CN 103049346 A 4/2013
EP 2827209 A2 1/2015
(Continued)

OTHER PUBLICATIONS

Chen, Jianjun, "Research of Joint Failure Importance in Fault Tree Analysis," Dalian Jiaotong University; pp. 1-16; https://wenku.baidu.com/view/d7092c7855270722192ef779.htm; 2010. 28 pages
(Continued)

*Primary Examiner* — Carlos R Ortiz Rodriguez
(74) *Attorney, Agent, or Firm* — Schmeiser, Olsen & Watts LLP

(57) ABSTRACT

A computer-based method for automated hazard detection for a technical system, the method includes the step of selecting an output failure mode of a component of a component fault tree of the technical system as a top level hazard. The computer-based method includes the step of generating a hazard information tree by means of a subtree of the component fault tree, wherein the subtree is selected by means of the top level hazard, wherein the subtree is modified by removing predefined nodes from the subtree and by enhancing output failure modes of the subtree with information from which component the output failure modes originate, wherein the modified subtree is saved in a memory unit as hazard information tree. The computer-based method includes the step of evaluating the hazard information tree, and providing a control signal comprising a result of the evaluation.

16 Claims, 4 Drawing Sheets

(56) References Cited

U.S. PATENT DOCUMENTS

| | | |
|---|---|---|
| 2015/0193290 A1 | 7/2015 | He et al. |
| 2016/0170868 A1 | 6/2016 | Hoefig et al. |
| 2016/0171506 A1 | 6/2016 | Hofig |
| 2017/0364063 A1 | 12/2017 | Zeller |

FOREIGN PATENT DOCUMENTS

| | | |
|---|---|---|
| EP | 2876519 A2 | 5/2015 |
| EP | 3260940 A1 | 12/2017 |
| JP | 2012098820 A | 5/2012 |

OTHER PUBLICATIONS

Office Action in related Chinese Patent Application No. 20171474580.1; dated Feb. 3, 2020. 11 pages.

Eisenbahnbundesamt (EBA): Sirf 400: Sicherheitsrichtlinie Fahrzeugausführungsbestimmungen (2012).

Grunske L et al: "Automatic Generation of Analyzable Failure Propagation Models from Component-Level Failure Annotations", Quality Software, 2005. (QSIC 2005). Fifth International Conference on Melbourne, Australia Sep. 19-20, 2005, Piscataway, NJ, USA,IEEE, pp. 117-123, XP010882272, DOI: 10.1109/QSIC.2005.16 ISBN: 978-0-7695-2472-6.

Vesely, W.E., Goldberg, F.F., Roberts, N.H., Haasl, D.F.: Fault Tree Handbook. US Nuclear Regulatory Commission (1981).

Extended European Search Report for EP Application No. EP 16175543.4, dated Jan. 30, 2017.

\* cited by examiner

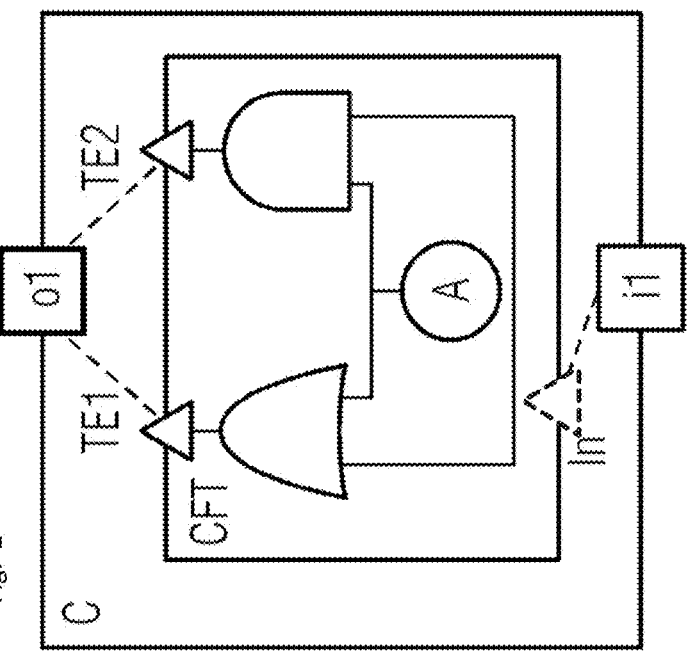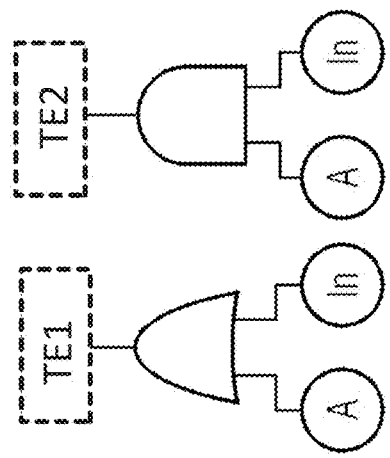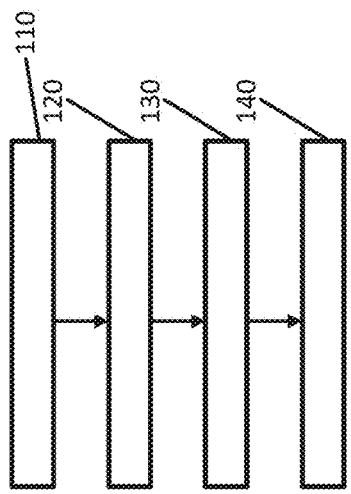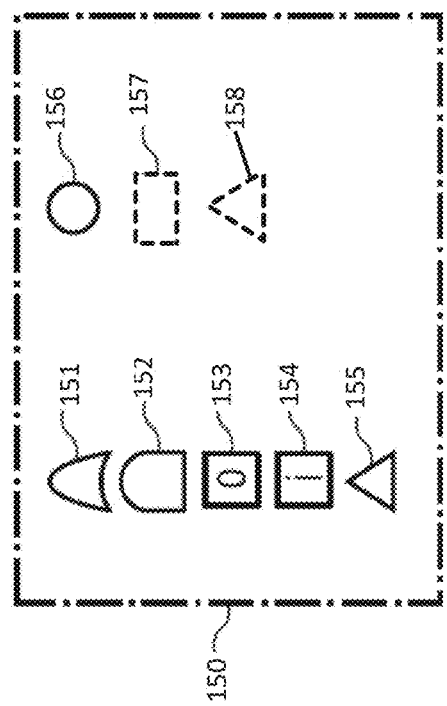

METHOD AND APPARATUS FOR AUTOMATED HAZARD DETECTION

CROSS-REFERENCE TO RELATED APPLICATIONS

This application claims priority to European application No. EP16175543.4 having a filing date of Jun. 21, 2016, the entire contents of which are hereby incorporated by reference.

FIELD OF TECHNOLOGY

The following relates to a method and apparatus for automated hazard detection of a technical system or components of the technical system.

BACKGROUND

The importance of safety-relevant systems in many application domains of embedded systems, such as aerospace, railway, health care, automotive and industrial automation is continuously growing. Thus, along with the growing system complexity, also the need for safety assessment as well as its effort is increasing drastically in order to guarantee the high quality demands in these application domains. Therefore, the safety assessment aims at identifying drawbacks or insufficiencies of the system architecture in terms of safety. The early identification of such drawbacks is crucial for a cost efficient development process.

The goal of the safety assessment process is to identify all failures that cause hazardous situations and to demonstrate that their probabilities are sufficiently low. In the application domains of safety-relevant systems the safety assurance process is defined by the means of safety standards (e.g., the IEC 61508 standard). Traditionally, the analysis of a system in terms of safety consists of bottom-up safety analysis approaches, such as Failure Mode and Effect Analysis (FMEA), and top-down ones, such as Fault Tree Analysis (FTA), to identify failure modes, their causes, and effects with impact on the system safety. With Component Fault Trees (CFTs) there is a model- and component-based methodology for fault tree analysis, which supports reuse by a modular and compositional safety analysis strategy. Component fault tree elements can, for example, be related to development artefacts and can be reused along with the respective development artefact.

Such modular or compositional safety analysis methodology eases the adoption to changes for existing development artefacts by constraining the adoption activities to the artefacts that require changes and provide benefits for an automated proof. In addition to the analysis of the system in terms of safety, there are safety standards and regulations that also require a systematic assessment and decomposition of the systems' hazards or its safety requirements (e.g. de fined by the German Federal Railway Authority for rolling stock or ISO 26262 in the automotive domain). In current practice, such assessments are conducted based on separately build models which are error-prone and time-consuming.

SUMMARY

An aspect relates to providing a method and apparatus for a less error-prone automated hazard detection for a technical system.

A first aspect of the present embodiments of the invention provides a computer-based method for automated hazard detection for a technical system, said method comprising the steps of:
selecting an output failure mode of a component of a component fault tree of the technical system as a top level hazard;
generating a hazard information tree by means of a subtree of the component fault tree, wherein
the subtree is selected by means of the top level hazard, and
the subtree is modified by removing predefined nodes from the subtree and by enhancing output failure modes of the subtree with information from which component the output failure modes originate;
the modified subtree is saved in a memory unit as hazard information tree;
evaluating the hazard information tree;
providing a control signal comprising a result of the evaluation.

Unless specifically stated otherwise, as apparent from the following discussions, it is appreciated that throughout the specification discussions utilizing terms such as "processing", "computing", "computer-based", "calculating", "determining", "generating", "configuring" or the like, refer to the action and/or processes of a computer that manipulates and/or transforms data into other data, said data represented as physical, e.g. such as electronic, quantities. The term "computer" should be expansively construed to cover any kind of electronic device with data processing capabilities, including, by way of non-limiting example, personal computers, servers, handheld computer systems, Pocket PC devices, Cellular communication device and other communication devices with computing capabilities, processors and other electronic computing devices.

As used herein, the term "processor" refers, for example, to controllers, microcontrollers (e.g. digital signal processor (DSP) possibly in combination with memory and storage units memory unit storing computer-readable instructions, application specific integrated circuit "ASIC", etc.), processor cores, central processing units, integrated circuits/processing circuitry (e.g. application specific integrated circuit "ASIC", field programmable gate arrays "FPGA" etc.) or digital signal processors. Furthermore, the term "processor" can, for example, refer to virtual processors, virtual CPUs, soft processors or soft CPUs. Moreover, said processor can, for example, be configured to execute computer readable instructions such that said processor is preferably configured to perform functions which implement embodiments of the invention.

As used herein, the term "module" refers, for example, to a processor and/or a memory unit storing computer-readable instructions. For example, the processor is specifically configured to execute the computer readable instructions such that said processor is preferably configured to perform functions which implement embodiments of the invention, such as a step of the inventive method.

As used herein, the term "optimized", "optimization" of a hazard information tree or the like refers, for example, to a reduction of nodes or elements of a hazard information tree.

As used herein, the term "node" preferably of a hazard information tree, component fault tree, a subtree of a component fault tree or the like, refers, for example, to elements contained in these data structures. This elements can, for example, be (logic) gates (e.g., AND-Gates or OR-Gates), ports (e.g., component output ports, component input ports), failure modes (e.g., input failure modes, output failure modes), events (e.g., basic events, top level events), component fault tree elements or a combination. Preferably, not all possible nodes/node types are available in all trees types. Preferably, component input ports or just input ports can also be called inports. Preferably, component output ports or just output ports can also be called outports. Preferably, each node is a dataset or a data structure containing information about the elements of a hazard information tree, component fault tree, a subtree of a component fault tree or the like.

As used herein, the term "component" preferably in context of a hazard information tree, component fault tree, a subtree of a component fault tree or the like, refers, for example, to a component fault tree element storing information about a component of the technical system.

As used herein, the term "predefined nodes" refers, for example, to ports, input failure modes, events and component fault tree elements.

As used herein, the term "component fault tree element" refers, for example, to a representation of a component of the technical system, for example, in a component fault tree. A component fault tree element can, for example, group nodes of a component fault tree related to the component of the technical system. Removing a component fault tree element, for example, from the subtree removes only the group information. Preferably, by removing a component fault tree element, information about the relationship of output failure modes and the component fault tree elements comprising the respective output failure modes are added to the respective output failure modes.

As used herein, the term "a technical system" refers, for example, to a device, apparatus or a plant. A technical system can, for example, be a field device, a generator or a power plant (e.g., a wind turbine, a nuclear power plant or a water power plant). Preferably, the technical system comprises a plurality of hardware components and/or software components. Furthermore, the technical system can, for example, comprise at least one component having a communication interface configured to connect the inventive apparatus and/or a test environment.

As used herein, the term "top level hazard" refers, for example, to an undesired hazard of the technical system or a component/subsystem of the technical system.

As used herein, the term "subtree", "tree", "component fault tree", "model", "meta model" or the like, refer, for example, to data structures storing information about the technical system and/or components of the technical system. Preferably, a subtree is a branch of a (component fault) tree or a partial (component fault) tree, defined, for example, by a selected node in the tree as top level node of the subtree.

As used herein, the term "model", "component", "failure mode" and other elements of a component fault tree or the like, refer, for example, especially in conjunction with a subtree or tree to data structures containing information about the technical system and/or its components.

Preferably, before selecting the top level hazard, failure modes are mapped to hazards (e.g., generated from the information available in a pre-existing FMEA). This can, for example, be done by providing a mapping table defining which failure modes cause which hazards. Another approach is, for example, to already define the output failure modes of the component fault tree elements not in specific/technical way (e.g. commission or the door release signal) but in form of hazards, i.e. describing the effects of a failure mode (e.g. door is opened untimely).

Preferably, in the subtree the output failure modes of components or component fault tree elements are enhanced with information from which component the output failure modes originate. This output failure modes are, for example, a part of a component or a component fault tree element of the component fault tree or the (unmodified) subtree. The needed information can, for example, be extracted from the subtree before the predefined nodes are removed or the needed information can, for example, be extracted from the component fault tree. The output failure modes of the subtree can, for example, be enhanced by adding the information to the output failure modes about the component or component fault tree element from which the output failure mode originated (or to which component or component fault tree element an output failure mode is related). This can, for example, be implemented by extending a dataset or data structure representing the output failure modes in the subtree with this information. Alternatively, a lookup table can, for example, be used which can, for example, contain an identifier for each output failure mode and the needed information to enhance the output failure mode. Preferably, the resulting output failure modes are called enhanced output failure modes.

Preferably, the inventive method simplifies significantly the hazard assessment of the technical system and/or the components of the technical system, because both during the system design two completely separated models are not needed. Furthermore, preferably a manually maintained hazard assessment is as well avoided. This significantly improves, for example, the development of technical systems (or a component of the technical system), in which frequent change requests are part of the development strategy (e.g. iterative or agile development strategies) and where prototypes a continuously tested and evaluated with regard to possible hazards. Preferably, only one safety analysis model must be built and maintained during the development life-cycle. The information required, for example, for the hazard assessment and decomposition are preferably extracted in an automated from the safety analysis model (in form of a component fault tree) and can, for example, be synchronized when the safety analysis model is modified. Preferably, the effort needed for safety assessment is significantly reduced, since, for example, only one model as basis for all analyses must be maintained.

In other words, preferably the inventive method automatically generates hazard information (in form of a hazard information tree) from component fault trees preferably to enable a systematic assessment and decomposition of this information. Preferably, the information required for the hazard assessment or decomposition is, for example, extracted from a component fault tree and can, for example, be synchronized in case the component fault tree is modified. Thus, a dedicated model for the assessment of hazard information must not be built and maintained manually. Moreover, our approach can be extended to automated the allocation of Safety Integrity Levels (SILs). Component fault trees can be used to perform a quantitative Fault Tree Analysis (FTA) to calculate the Unavailability (U) or the Probability of Failure on Demand (PFD) for any failure mode within the component fault tree. Hence, a SIL can be derived for each output failure mode of the component fault tree and since an output failure mode within a component fault tree is always allocated to one specific system element, the generate hazard information can be extend by a SIL also derived from the component fault tree.

For example, other safety standards (such as ISO26262 in the automotive domain) allow the iterative refinement of safety requirements (in the form of ASILs, Automotive Safety Integrity Levels) from the system and sub-system level to the detailed hardware and software component design. This so-called ASIL decomposition approach is, for example, introduced in Part 9 of the ISO26262 standard and allows the reduction of the safety levels by decomposing the safety requirements over redundant and sufficiently independent elements. For example, the decomposition—when applied—results in safety requirements, for example, with lower ASIL allocated to the redundant elements. More particularly, higher ASIL implies higher cost, the ASIL decomposition can, for example, help to meet the safety requirements without incurring excessive costs.

For example, the ASIL decomposition in the automotive domain uses tree-like diagrams, which are similar to the hazard tree (German Gefährdungsbäume) in railway, can be used for the decomposition of safety requirements. Preferably, the inventive method can also be use in the context of automotive systems to automatically generate trees to enable ASIL decomposition. For example, a prerequisite for the ASIL decomposition is that safety requirements must be negated and used as output failure modes to build the component fault tree or subtree. For example, the safety requirement "airbag must be ignited at latest after 45 ms" is transformed into the hazard "airbag is not ignited after 45 ms". In other words, an ASIL data structure is, for example, converted into a component fault tree prior to the selection of the top level hazard. Preferably, afterwards the inventive method steps a executed.

In an embodiment of the method a number of nodes of the hazard information tree are optimized prior to the evaluation of the hazard information tree.

Preferably, by optimizing or reducing the number of nodes of the hazard information tree, the duration of the evaluation of the hazard information tree can, for example, be significantly reduced.

In another embodiment of the method gates without child nodes are removed from the hazard information tree for optimizing the hazard information tree.

In another embodiment of the method gates with one child node are removed from the hazard information tree for optimizing the hazard information tree.

In another embodiment of the method interconnected gates of the same type are merged for optimizing the hazard information tree.

In another embodiment of the method the control signal comprises information about a probability of failure on demand and/or an unavailability and/or safety integrity level of the technical system.

Preferably, by providing that information of the technical system a test environment, e.g., a test bed for a prototype of the technical system or component of the technical system can, for example, verify the hazard assessment or detected hazards. This can, for example, reduce significantly the development time of the technical system (or a component of the technical system), because critical components can preferably be identified in a significantly shorter time.

In another embodiment of the method a test-environment is configured to perform a hazard assessment of the technical system by means of the hazard information tree.

Preferably, by configuring a test environment for the technical system by means of the hazard information tree, the duration of a hazard assessment of a prototype of the technical system or component of the technical system can, for example, be significantly reduced, because critical components can preferably be identified in a significantly shorter time.

In another embodiment of the method the control signal controls a/the test environment for testing the technical system.

Preferably, by controlling a test environment the development time of the technical system (or a component of the technical system) can, for example, be significantly reduced, because critical components can preferably be identified in a significantly shorter time.

A further aspect of embodiments of the present invention provides an apparatus for automated hazard detection for a technical system, said apparatus comprising
 a selection module for selecting an output failure mode of a component of a component fault tree of the technical system as a top level hazard;
 a generation module for generating a hazard information tree by means of a subtree of the component fault tree, wherein
  the subtree is selected by means of the top level hazard, and
  the subtree is modified by removing predefined nodes from the subtree and by enhancing output failure modes of the subtree with information from which component the output failure modes originate;
  the modified subtree is saved in a memory unit as hazard information tree;
 an evaluation module for evaluating the hazard information tree;
 a providing module for providing a control signal comprising a result of the evaluation.

In an embodiment of the apparatus, the apparatus comprises an optimization module to optimize a number of nodes of the hazard information tree.

In another embodiment of the apparatus, the optimization module removes tree gates without child nodes from the hazard information tree.

In another embodiment of the apparatus, the optimization module removes tree gates with one child node from the hazard information tree, and wherein the optimization module preferably merges gates with one child node from the hazard information tree interconnected gates of the same type.

In another embodiment of the apparatus, the apparatus comprises at least one further module to implement further embodiments of the inventive method for providing a soft sensor.

A further aspect of embodiments of the present invention provides a system comprising an inventive apparatus configured to perform automated hazard detection for a technical system.

A further aspect of embodiments of the present invention provides a computer program product storing executable instructions adapted to perform the method disclosed by the present disclosure.

According to a preferred variant of the computer program product, the program product stores executable instructions adapted to configure a manufacturing device, for example, a 3D-printer or another device to create the inventive device/apparatus or system.

Furthermore, a providing apparatus is claimed for saving and/or providing a program data and/or instruction block of said executable instructions (method and/or device). The providing apparatus can be a data storage saving and/or providing the computer program product. Alternatively, the providing apparatus can be a computer system and/or a server system and/or a network and/or a cloudbased computer system and/or virtual computer system. The providing apparatus saves and/or provides the computer program product. Preferably, the complete computer program product is provided by said providing apparatus in the form of a download, for example, as a file or a data stream. Alternatively, the computer program product is provided by at least two partial downloads, for example, provided by a peer to peer network, each containing a piece of said computer program product. For example such a computer program product can be provided by a data storage, which is read and executed by a computer system. As a consequence the computer system is able to execute the disclosed method. Alternatively and/or additionally, the computer program configures a manufacturing device as above mentioned.

A data storage or computer-readable medium can be electronic, magnetic, optical, or a semiconductor system (or apparatus or device). Examples of a computer-readable medium include, but are not limited to, a semiconductor or solid state memory, magnetic tape, a removable computer diskette, a random access memory (RAM), a read-only memory (ROM), a rigid magnetic disk, an optical disk, etc. Current examples of optical disks include compact disk-read only memory (CD-ROM), compact disk-read/write (CD-R/W) and digital versatile disk (DVD).

Further modifications and variations will emerge from the features of the dependent claims.

BRIEF DESCRIPTION

Some of the embodiments will be described in detail, with reference to the following figures, wherein like designations denote like members, wherein:

FIG. 1 shows a classic fault tree;

FIG. 2 shows a component fault tree;

FIG. 4 shows a flowchart of a possible exemplary embodiment of an inventive method for automated hazard detection;

Figure 11:
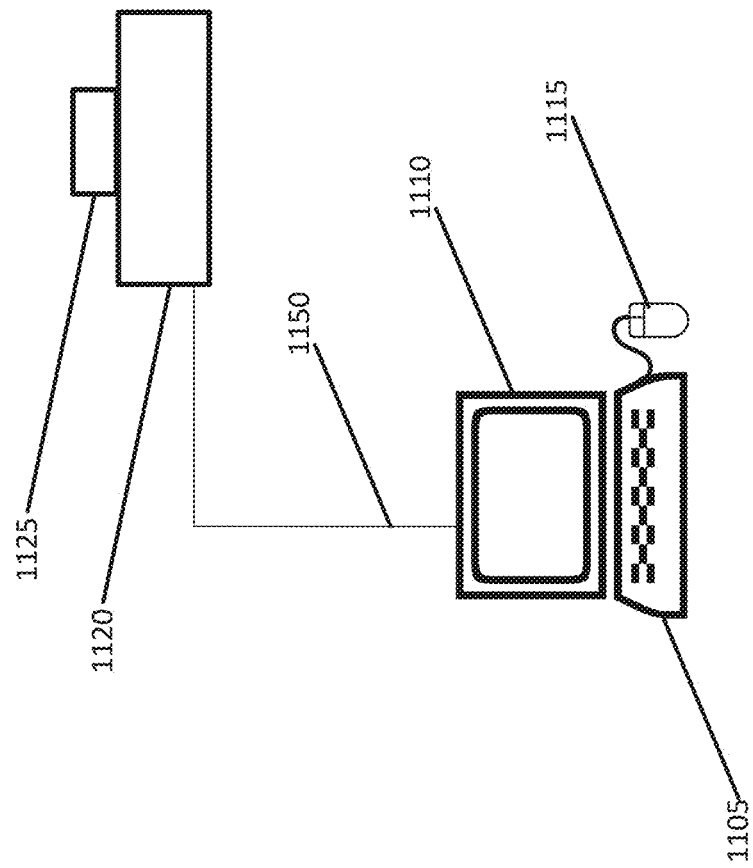
Figure 10:
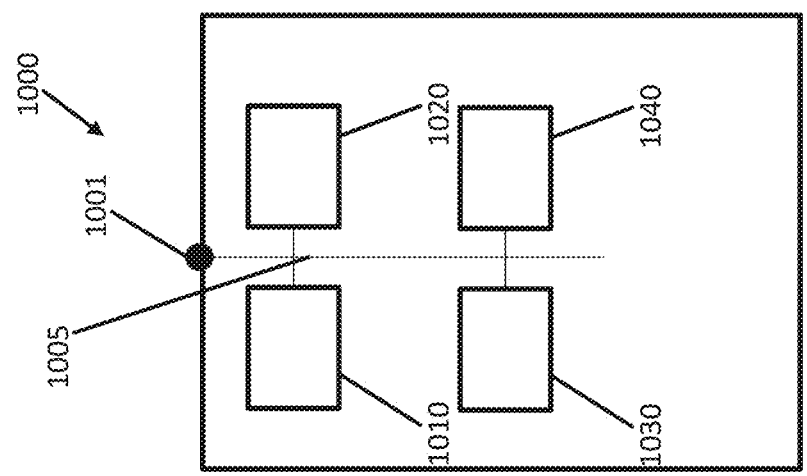

FIG. 10 a schematic for an apparatus for automated hazard detection according to an embodiment; and FIG. 11 a schematic of a system according to an embodiment;

The accompanying drawings are intended to provide a better understanding of the embodiments. They show schematics of embodiments and serve in conjunction with the description to explain principles and concepts of the disclosed subject matter. Other embodiments and many of the cited advantages will emerge in respect of the drawings. The elements of the drawings are not necessarily shown in scale with one another. Identical reference characters here designate identical components or components of comparable effect.

Preferably, the presented embodiments are implemented by a processor and/or a memory device unless otherwise noted.

In detail, to implement and/or execute embodiments of the invention, the inventive method, components, devices etc. comprise at least one processor and/or at least one memory unit (e.g. a hard disk drive, cache memory, secure digital memory card, random-access memory) unless otherwise noted. Additionally, the inventive method, components, devices etc. comprise, for example, other features known by a skilled person. For example, these features can be an input device, like a computer mouse, or a display device, like a TFT-display.

DETAILED DESCRIPTION

FIG. 1 shows a conventional classic fault tree and FIG. 2 shows a corresponding component fault tree CFT. Furthermore, FIG. 1 shows a legend 150 which shall be used for all other figures. In detail, the legend 150 depicts (logic) gates (e.g., OR-Gates 151, AND-Gates 152), ports (e.g., component output ports 153, component input ports 154), failure modes (e.g., input failure modes 158, output failure modes 155), events (e.g., basic events 156, top level events 157), component fault tree elements or a combination. It shall, for example, be understood that not all possible nodes/node types are available in all possible trees.

Usually, a component fault tree is a Boolean model associated to system development elements such as components (e.g. Software components, subsystem, devices, etc. of a technical system). It has, for example, the same expressive power as classic fault trees that can for example be found in [1]. Classic fault trees as well as component fault trees are used to model failure behaviour of safety relevant systems (e.g. technical systems).

This failure behaviour is, for example, used to document that a system is safe and can also be used to identify drawbacks of the design of a system.

In a component fault tree CFT, a separate component fault tree element is related to a component. Failures that are visible at the component output port of a component fault tree element are models using output failure modes which are related to the specific component output port. To model how specific failures propagate from a component input port of a component fault tree element to the component output port, input failure modes are used. The internal failure behaviour that also influences the output failure modes is modelled using the Boolean/logic gates such as OR 151 and AND 152 as well as basic events 156.

In both trees of FIG. 1 and FIG. 2, the top events or output failure modes TE1 and TE2 can be modelled. Additionally, to the Boolean formulae (logic gates) that are also modelled within the classic fault tree illustrated in FIG. 1, the component fault tree model illustrated in FIG. 2 allows to associate the specific top events TE to the corresponding component output ports where these failures can appear. Top event TE1, for example, appears at component output port o1.

In FIG. 2, an Input Failure Mode In is associated with component input port i1 of the component C. The inner failure behaviour is modelled by basic event A as input to an OR gate and an AND gate. Using this methodology of components also within fault tree models, benefits during the development of the complex system can be observed, for example, an increased maintainability of the safety analysis model.

Figure 3:
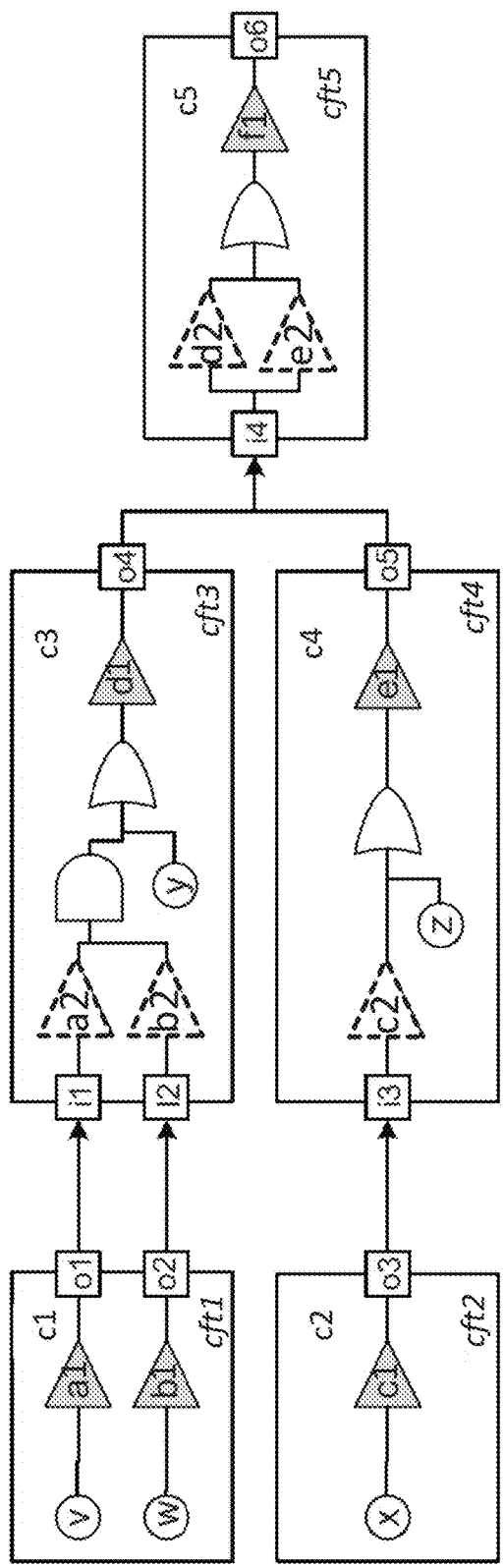
FIG. 3 shows a diagram of a generated component fault tree used by a possible exemplary embodiment of an inventive method for automated hazard detection.

FIG. 3 shows a diagram of a generated fault tree used by a possible exemplary embodiment of an inventive method for automated hazard detection.

In detail, the generation of a component fault tree CFT is illustrated which is used by embodiments of the invention which can automatically extract hazard information allocated to development artefacts (e.g. hardware or software components) from component fault trees. Let the System Sys consist of a set of components C={c1, . . . , cn}, e.g., a first component c1, a second component c2, a third component c3, a fourth component c4 and a fifth component c5. Each component c∈C includes a set of input ports IN(ci)={$in_1$, ..., $in_p$} and a set of output ports OUT(c)={$out_1$, ..., $out_q$}. The information flow between the output ports of a component ci∈C and the input ports of another component cj∈C (with ci≠cj) is represented be a set of connections CON={($out_x$,$in_y$)|$out_x$∈OUT(ci),$in_y$∈IN(cj)}

The example system presented as depicted in FIG. 3 is defined by:

C={c1,c2,c3,c4,c5}

OUT(c1)={o1,o2}

OUT(c2)={o3}

OUT(c3)={o4}

OUT(c4)={o5}

OUT(c5)={o6}

IN(c3)={i1,i2}

IN(c4)={i3}

IN(c5)={i4}

CON=f(o1,i1),(o2,i2),(o3,i3),(o4,i4),(o5,i4)} wherein o1 is a first component output port of the first component c1; o2 is a second component output port of the first component c2; o3 is a third component output port of the first component c2; o4 is a fourth component output port of the third component c3; o5 is a fifth component output port of the fourth component c5; o6 is a sixth component output port of the fifth component c5; i1 is a first component input port of the third component c3; i2 is a second component input port of the third component c3; o3 is a third component input port of the fourth component c4; o4 is a fourth component input port of the fifth component c5. The component output ports and component input ports are preferably associated with corresponding component fault tree element of its component.

If ci∈C has a (cft) component fault tree element cfti∈CFT, then it is CFT(ci)=cfti with cfti≠∅. In other words, CFT defines the distinct mapping of component fault tree elements cfti with a component ci. CFT(ci)=cfti describes this relation as a function. Each component fault tree element cfti∈CFT(ci) of a component ci∈C may have input failure modes IFM($in_k$)={$ifm_1$, ..., $ifm_s$} which are related to a input port $in_k$∈IN(ci) as well as output failure modes OFM($out_l$)={$ofm_1$ ..., $ofm_t$} which are related to an output port $out_l$∈OUT(ci). Moreover, a component fault tree element cfti∈CFT may have a set of basic event B(cfti)={$b_1$, ..., $b_r$}. Input and out failure modes as well as Basic Events are connected via logical gates (AND, OR, and M out of N) by a set of directed edges.

In our example system, a component fault tree element is specified for each of the components c3, c4, and c5 as follows:

CFT(c1)=cft1

CFT(c2)=cft2

CFT(c3)=cft3

CFT(c4)=cft4

CFT(c5)=cft5 wherein cft1 is a first component fault tree element of the first component c1; cft2 is a second component fault tree element of the second component c2; cft3 is a third component fault tree element of the third component c3; cft4 is a fourth component fault tree element of the fourth component c4; cft5 is a fifth component fault tree element of the fifth component c5.

OFM(o1)={a1}

IFM(i1)={a2}

OFM(o2)={b1}

IFM(i2)={b2}

OFM(o3)={cm1}

IFM(i3)={cm2}

OFM(o4)={d1}

IFM(i4)={d2,e2}

OFM(o5)={e1}

IFM(i5)={f2} (not depicted)

OFM(o6)={f1} wherein a1 is a first output failure mode of the first component c1; b1 is a second output failure mode of the first component c1; cm1 is a third output failure mode of the second component c2; d1 is a fourth output failure mode of the third component c3; e1 is a fifth output failure mode of the fourth component c4; f1 is a sixth output failure mode of the fifth component c5; a2 is a first input failure mode of the third component c3; b2 is a second input failure mode of the third component c3; cm2 is a third input failure mode of the fourth component c4; d2 is a fourth input failure mode of the fifth component c5; e2 is a fifth input failure mode of the fifth component c5; f2 is a sixth input failure mode of the sixth component c6 (not depicted);

B(cft1)={v,w}

B(cft2)={x}

B(cft3)={y}

B(cft4)={z}

B(cft5)={ } wherein v is a first basic event of the first component c1; w is a second basic event of the first component c1; x is third basic event of the second component c2; y is fourth basic event of the third component c3; z is fifth basic event of the fourth component c4;

Preferably, the failure modes of the component fault tree are converted into hazards to generate a hazard information tree. This can, for example, be done by providing a mapping table preferably defining which failure modes cause which hazards (e.g. generated from the information available in a preexisting FMEA). Another approach is, for example, to already define the output failure modes of the component fault tree elements not in specific/technical way (e.g. commission or the door release signal) but in form of hazards, i.e. describing the effects of a failure mode (e.g. door is opened untimely).

The (converted/unconverted) component fault tree is, for example, used as an input for the inventive method depicted in FIG. 4.

FIG. 4 shows a flowchart of a possible exemplary embodiment of the invention implemented as an inventive method for automated hazard detection.

In detail FIG. 4 depicts a computer-based method for automated hazard detection for a technical system, wherein said method comprises a first step of selecting 410 an output failure mode of a component of a component fault tree of the technical system as a top level hazard TLH.

Preferably, the top level hazard represents the undesired hazard for which the assessment is performed or which is decomposed.

$$TLH = out_i \in OUT(ci) \text{ with } ci \in C$$

For the exemplary system defined in FIG. 3, we select f1 as the top level hazard (output failure mode) (TLH=f1).

Furthermore, the computer-based method comprises a second step for generating (420) a hazard information tree by means of a subtree of the component fault tree, wherein the subtree is selected by means of the top level hazard. Moreover, in the second step the subtree is modified by removing predefined nodes from the subtree and by enhancing output failure modes of the subtree with information from which component the output failure modes originate. Additionally, in the second step the modified subtree is saved in a memory unit as hazard information tree.

In other words, a partial fault tree (subtree) for the selected output failure mode/top level hazard of the component fault tree is preferably created: This is, for example, done by removing the component fault tree elements (one of the predefined nodes/node types), such as the first component fault tree element cft1, the second component fault tree element cft2, the third component fault tree element cft3, the fourth component fault tree element cft4 and the fifth component fault tree element cft5, as well as its ports, resulting in a preferably simplified failure propagation logic with the previously defined top level hazard as the top event of this partial fault tree.

Moreover, each output failure mode is enhanced with the information to which component the output failure mode is related. This enhanced output failure modes are, for example, depicted in FIG. 5 as first enhanced output failure mode c1.a1 of the first component c1, second enhanced output failure mode c1.b1 of the first component c1, third enhanced output failure mode c2.cm1 of the second component c2, fourth enhanced output failure mode c3.d1 of the third component c3, fifth enhanced output failure mode c4.e1 of the fourth component c4 and sixth enhanced output failure mode c5.f1 of the fifth component c5.

Figure 5:
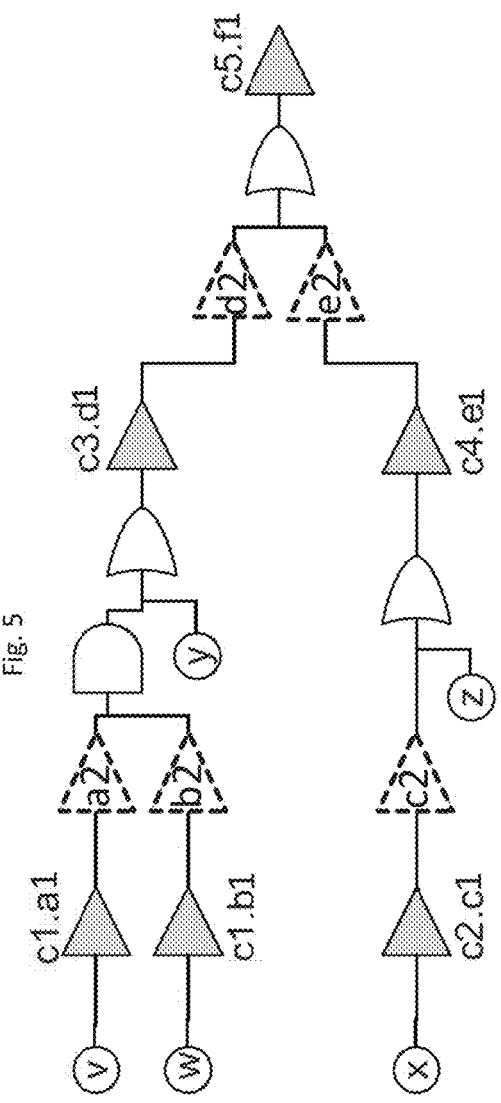
FIG. 5 shows a diagram of a subtree processed by means of an embodiment.

The partial fault tree pFT (subtree) represents all hazards on component-level which lead to the top level hazard on system-level. The resulting partial fault tree is illustrated in FIG. 5.

Figure 6:
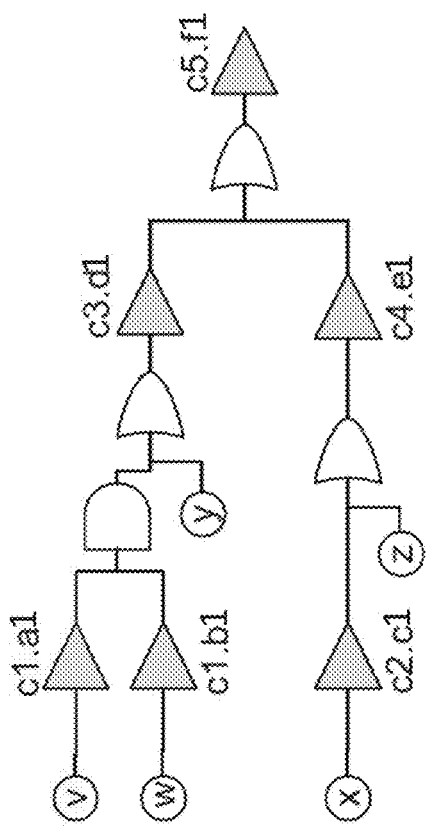
FIG. 6 shows a diagram of a subtree processed by means of an embodiment.

Moreover, all input failure modes (one of the predefined nodes/node types) from the partial fault tree (subtree) are preferably removed. Since input failure modes preferably represent the same information as the output failure modes, which are connected with the input failure modes, these redundant information are removed from the partial fault tree. FIG. 6 shows the results for our exemplary system shown in FIG. 3.

Furthermore, all basic events (one of the predefined nodes/node types) from the partial fault tree (subtree) are preferably removed. Since basic events preferably represent internal causes of components which lead to failure modes or hazards, the basic events are removed from the partial fault tree.

Figure 7:
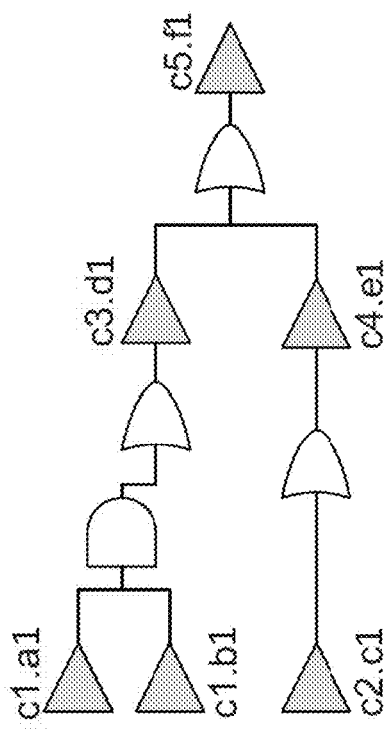
FIG. 7 shows a diagram of a subtree processed by means of an embodiment.

In other words, after removing the predefined nodes this results preferably in the Hazard Information Tree (HIT), a tree-like representation of the systems' hazard information (similar to Gefährdungsbäume as defined by the German Federal Railway Authority [2]). FIG. 7 shows the results for our exemplary system shown in FIG. 3.

In a preferred embodiment of the invention, the resulting hazard information tree/subtree is optimized. In order to optimize the hazard information tree, the following tasks are performed:

Remove all logical gates from the subtree/hazard information tree which have no children.

Remove all gates from the subtree/hazard information tree which only have one child node.

Merge interconnected gates of the subtree/hazard information tree which have the same type (e.g. two OR-gates or AND-gates)

Figure 8:
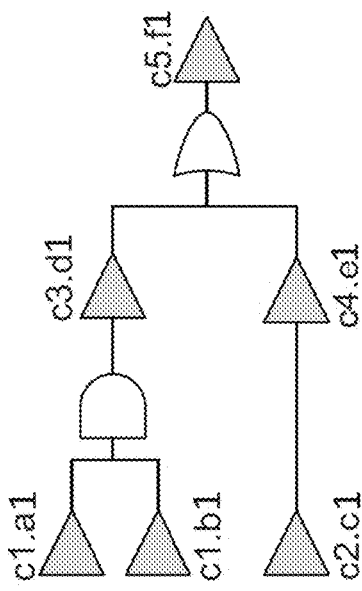
FIG. 8 shows a diagram of a subtree processed by means of an embodiment.

FIG. 8 shows the results of optimizing the subtree/hazard information tree for our exemplary system shown in FIG. 3.

Figure 9:
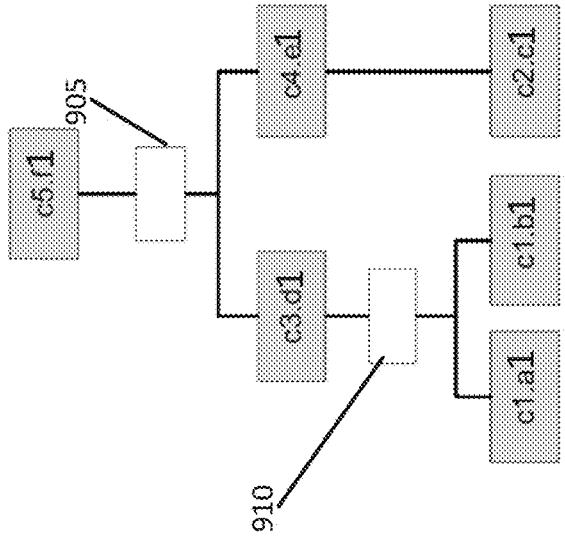
FIG. 9 shows a diagram of a hazard information tree generated by means of an embodiment.

FIG. 9 shows the resulting hazard information tree (HIT) based on automatically generate hazard information from the component fault tree of the exemplary system of FIG. 3. The top node represents the top level hazard (TLH) of the system decomposed into hazards on component level which contribute to the top level hazard. Each component level hazard/CLH (enhanced output failure mode) is allocated to a specific development artefact and interconnected using Boolean gates (such as AND 910 or OR 905).

Furthermore, the computer-based method illustrated in FIG. 4 comprises a third step for evaluating 430 the hazard information tree.

Furthermore, the computer-based method illustrated in FIG. 4 comprises a fourth step for providing 440 a control signal comprising a result of the evaluation.

In our example, the analysis of the generated hazard information tree reveals that the hazards c3.d1 or c4.e1 would lead to the top level hazard f1/c5.f1. Thus, failure mitigation techniques must be introduced to avoid hazard/enhanced output failure mode c1.d1 of component c3 and hazard/enhanced output failure c4.e1 of component c2 in order to avoid the top level hazard f1 or c5.f1.

Preferably, the inventive method can automatically generate a hazard information tree from component fault trees to enable the systematic assessment and decomposition of this information. Preferably, embodiments of the invention reduce significantly the effort during the development since only one model must be built and maintained instead of two (hazard information tree and a component fault tree). Preferably, the information required for the hazard assessment or decomposition is extracted from a component fault tree and can be synchronized in case the component fault tree is modified.

Thus, preferably a dedicated model for the assessment of hazard information must not be built and maintained manually. Moreover, embodiments of the invention can, for example, be extended to automate the allocation of safety integrity levels (SILs). Component fault trees can, for example, be used to perform a quantitative fault tree analysis (FTA) to calculate the Unavailability (U) or the probability of failure on demand (PFD) for any failure mode within the component fault tree. Hence, a safety integrity level can, for example, be derived for each output failure mode of the component failure tree and since an output failure mode within a component failure tree is preferably allocated to one specific system element, the generated hazard information can be extend by a safety integrity level also derived from the component fault tree.

For example, other safety standards (such as ISO26262 in the automotive domain) allow the iterative refinement of safety requirements (in the form of automotive safety integrity levels/ASILs) from the system and sub-system level to the detailed hardware and software component design. This so-called ASIL decomposition approach is, for example, introduced in Part 9 of the ISO26262 standard and allows the reduction of the safety levels by decomposing the safety requirements over redundant and sufficiently independent elements. Preferably, the decomposition when applied results in safety requirements with lower ASIL allocated to the redundant elements. Since higher ASIL implies higher cost, the ASIL decomposition can, for example, help to meet the safety requirements without incurring excessive costs. Preferably, for the ASIL decomposition in the automotive domain tree-like diagrams, which are similar to the Gefährdungsbäume in railway, can, for example, be used for the decomposition of safety requirements. Hence, embodiments of the invention can, for example, also be use in the context of automotive systems to automatically generate trees to enable ASIL decomposition. Preferably, as a prerequisite, safety requirements are, for example, negated and used as output failure modes to build the component fault tree. For instance, the safety requirement "'airbag must be ignited at latest after 45 ms'" is transformed into the hazard "'airbag is not ignited after 45 ms'".

In another preferred embodiment of the invention, a processor is specifically configured to execute the computer readable instructions such that said processor is preferably configured to perform functions which implement a step/all steps of the inventive method.

FIG. 10 shows an apparatus for automated hazard detection according to an embodiment of the invention.

In detail, FIG. 10 shows an apparatus 1000 for automated hazard detection for a technical system, comprising a selection module 1010, a generation module 1020, an evaluation module 1030, a providing module 1040 and optionally an interface 1001, which are communicatively coupled or connected by a second bus 1005 (e. g. a data bus such as a PCI (Peripheral Component Interconnect) bus).

The selection module 1010 is configured to select an output failure mode of a component of a component fault tree of the technical system as a top level hazard.

The generation module 1020 is configured to generate a hazard information tree by means of a subtree of the component fault tree, wherein
   the subtree is selected by means of the top level hazard, and
   the subtree is modified by removing predefined nodes from the subtree and by enhancing output failure modes of the subtree with information from which component the output failure modes originate;
   the modified subtree is saved in a memory unit as hazard information tree.

The evaluation module 1030 is configured to evaluate the hazard information tree.

The providing module 1040 is configured to provide a control signal comprising a result of the evaluation.

The control signal can, for example, be transmitted to a test environment, e.g. shown in FIG. 11, for the technical system or to a development environment to inform a developer about the top level hazard and its dependencies.

The apparatus 1000 can comprise further components, such as a further processor and/or a memory unit and/or sensors to observe the behavior of components (e.g., to detect if a (enhanced) output failure/hazard mode has occurred) and/or further interfaces to communicate with a plurality (at least two) of test environments. Preferably, the apparatus 1000 comprises at least one further component, such as an input device (e.g. a computer keyboard or computer mouse) or a display device (e.g., a TFT-Monitor).

FIG. 11 shows a system according to an embodiment of the invention.

In detail, the system comprises an apparatus 1000 for automated hazard detection for a technical system 1125 (e.g. the inventive apparatus shown in FIG. 10) and a test environment (e.g. a test bed) for the technical system 1125. The test environment 1120 is connected by a network 1150 to a computer system 1110. For example, a developer can control the test environment by means of the computer system 1110 to analyze the behavior or run-time behavior of the technical system 1125 by means of the hazards of a hard information tree provided by the apparatus 1000.

As shown in FIG. 11, the apparatus 1000 can be included in the test environment 1120. Alternatively, the apparatus can, for example, be in included in the computer system 1111

The system 1100 can comprise further components, such as a further processor and/or a memory unit and/or sensors to observe the system behavior for hazards and/or further interfaces to communicate with a plurality (at least two) of test environments or to introduce specific failures into the technical system 1125 to evaluate its behavior in respect to detected hazards.

Preferably, the computer system 1110 comprises at least one further component, such as an input device (e.g. a computer keyboard 1105 or computer mouse 1115) or a display device (e.g., a TFT-Monitor 1110).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of, and not restrictive on, the broad embodiments of the invention, and that this invention not be limited to the specific constructions and arrangements shown and described, since various other modifications may occur to those ordinarily skilled in the art.

The described embodiments and developments can be combined in any manner with one another as far as this is expedient. Further possible embodiments, developments and implementations of embodiments of the invention also comprise not specifically cited combinations of features of embodiments of the invention described above or in the following in relation to the exemplary embodiments.

[1] Vesely, W. E., Goldberg, F. F., Roberts, N. H., Haasl, D. F.: Fault Tree Handbook. US Nuclear Regulatory Commission (1981)

[2] Eisenbahnbundesamt (EBA): Sirf 400: Sicherheitsrichtlinie Fahrzeugausführungsbestimmungen (2012)

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-based method for automated hazard detection for a technical system, comprising:
   mapping failure modes to hazards by at least one of providing a mapping table defining which failure modes cause which hazards and defining output failure modes of respective component fault tree elements in a form of hazards;
   selecting an output failure mode of a component of a component fault tree of the technical system as a top level hazard;
   generating a hazard information tree by means of a subtree of the component fault tree, wherein:
   the subtree is selected by means of the top level hazard, and
   the subtree is modified by removing predefined nodes from the subtree and by enhancing output failure modes of the subtree with information from which component the output failure modes originate, wherein the removing further includes removing the component fault tree elements resulting in a simplified failure propagation logic with the previously defined top level hazard as the top event of a partial fault tree;
   the modified subtree is saved in a memory unit as hazard information tree;
   evaluating the hazard information tree;
   providing a control signal comprising a result of the evaluation.

2. The method according to claim 1, wherein a plurality of nodes of the hazard information tree is optimized prior to the evaluation of the hazard information tree.

3. The method according to claim 1, wherein for optimizing the hazard information tree gates without child nodes are removed from the hazard information tree.

4. The method according to claim 1, wherein for optimizing the hazard information tree gates with one child node are removed from the hazard information tree.

5. The method according to claim 1, wherein for optimizing the hazard information tree interconnected gates of the same type are merged.

6. The method according to claim 1, wherein the control signal comprises information about a probability of failure on demand and/or an unavailability and/or safety integrity level of the technical system.

7. The method according to claim 1, wherein by means of the hazard information tree a test-environment is configured to perform a hazard assessment of the technical system.

8. The method according to claim 1, wherein the control signal controls a/the test environment for testing the technical system.

9. An apparatus for automated hazard detection for a technical system, comprising:
   a mapping module for mapping failure modes to hazards by at least one of providing a mapping table defining which failure modes cause which hazards and defining output failure modes of respective component fault tree elements in a form of hazards;
   a selection module for selecting an output failure mode of a component of a component fault tree of the technical system as a top level hazard;
   a generation module for generating a hazard information tree by means of a subtree of the component fault tree, wherein:
   the subtree is selected by means of the top level hazard, and
   the subtree is modified by removing predefined nodes from the subtree and by enhancing output failure modes of the subtree with information from which component the output failure modes originate, wherein the removing further includes removing the component fault tree elements resulting in a simplified failure propagation logic with the previously defined top level hazard as the top event of a partial fault tree;
   the modified subtree is saved in a memory unit as hazard information tree;
   an evaluation module for evaluating the hazard information tree;
   a providing module for providing a control signal comprising a result of the evaluation.

10. The apparatus according to claim 9, wherein the apparatus comprises an optimization module to optimize a number of nodes of the hazard information tree.

11. The apparatus according to claim 9, wherein the optimization module removes tree gates without child nodes from the hazard information tree.

12. The apparatus according claim 9, wherein the optimization module removes tree gates with one child node from the hazard information tree, and
   wherein the optimization module merges gates with one child node from the hazard information tree interconnected gates of the same type.

13. A system comprising the apparatus according to claim 9, configured to perform automated hazard detection for a technical system.

14. A non-transitory computer program product storing executable instructions adapted to configure a manufacturing device to manufacture the system according to claim 13.

15. A computer program product storing executable instructions adapted to perform the method according to claim 1.

16. A providing device for the non-transitory computer program product according to claim 14, wherein the providing device provides and/or saves the non-transitory computer program product.

* * * * *